United States Patent [19]

Persson

[11] Patent Number: 4,995,937

[45] Date of Patent: Feb. 26, 1991

[54] TAPE APPLYING ARRANGEMENT

[75] Inventor: Malte Persson, Torup, Sweden

[73] Assignee: Forenade Well AB, Torup, Sweden

[21] Appl. No.: 360,893

[22] PCT Filed: Nov. 30, 1987

[86] PCT No.: PCT/SE87/00568

§ 371 Date: May 31, 1989

§ 102(e) Date: May 31, 1989

[87] PCT Pub. No.: WO88/04272

PCT Pub. Date: Jun. 16, 1988

[30] Foreign Application Priority Data

Dec. 1, 1986 [SE] Sweden .................................. 860514

[51] Int. Cl.[5] .......................... B32B 31/04; B21F 5/00; B65C 9/25; C09J 5/00

[52] U.S. Cl. .................................... 156/543; 156/324; 156/554

[58] Field of Search ........................ 156/324, 543, 554; 53/133, 412; 493/212, 377, 930, 923, 963

[56] References Cited

U.S. PATENT DOCUMENTS

| | | | |
|---|---|---|---|
| 2,739,512 | 3/1956 | Conti | 493/930 X |
| 2,788,079 | 4/1957 | Allison | 493/930 X |
| 3,179,023 | 4/1965 | Hoff | 156/554 X |
| 3,303,758 | 2/1967 | Holt | 493/930 X |
| 3,566,752 | 3/1971 | Dreher | 156/260 X |
| 4,498,274 | 2/1985 | Vorhauer | 53/412 |

FOREIGN PATENT DOCUMENTS

| | | |
|---|---|---|
| 0116137 | 8/1984 | European Pat. Off. . |
| 0121371 | 10/1984 | European Pat. Off. . |
| 1761692 | 8/1971 | Fed. Rep. of Germany . |
| 2231321 | 9/1983 | Fed. Rep. of Germany . |
| 3338815 | 5/1985 | Fed. Rep. of Germany . |
| 203109 | 3/1966 | Sweden . |
| 448296 | 2/1987 | Sweden . |

*Primary Examiner*—William A. Powell

*Attorney, Agent, or Firm*—Fleit, Jacobson, Cohn, Price, Holman & Stern

[57] ABSTRACT

An arrangement for applying longitudinally extending tapes (10) to a moving web (11) comprises a plurality of holders (17) each intended for a respective tape store (18), and a plurality of tape applicators (19) for guiding a respective tape arriving from a tape store to a location at which the tape is in contact with the web. The holders (17) and the tape applicators (19) are carried by and capable of being positioned along mutually separate beams of a beam structure (14, 15, 16) which extends transversely to the direction of web travel. The applicators (19) can be adjusted positionally in relation to an applicator-setting beam (15) which extends transversely to the direction of web movement, and can be locked to this beam in selected positions therealong. The applicator-setting beam is, in turn, carried for longitudinal movement by a stationary carrier beam (14) which extends parallel with the applicator-setting beam. The applicator-setting beam can also have graduations (30) provided along the length thereof.

31 Claims, 5 Drawing Sheets

TAPE APPLYING ARRANGEMENT

The present invention relates to an arrangement for applying relatively narrow tapes or strips onto a moving material web in the direction of its length and particularly, but not exclusively, to an arrangement for applying self-adhesive tear tapes, or tear strips, to a moving paper web or a moving web of corrugated fibreboard, the arrangement being of the kind which incorporates a plurality of holders for supporting a respective tape store and a plurality of tape applicators for guiding a respective tape arriving from a tape store to a location in which the tape is in contact with the web, and of the kind in which tape-supply holders and said applicators along a beam structure which extends transversely to the direction of web travel.

When producing, e.g., webs of corrugated paperboard of fibreboard which are to be divided subsequently into blanks for forming packages, it is usual to apply tapes, which ultimately form tear tapes on the finished packages, onto the moving webs before the webs are divided into package blanks. Normally, each tape applicator and at least one tape-supply holder associated therewith can be displaced along a stationary transverse beam by means of a separate positioning device, and can be locked in relation to said beam. One drawback with this arrangement, however, is that if the web wanders laterally off course, the tapes will be positioned at varying distances from an edge of the web and therewith at varying distance from those edges of the finished package blanks which extend parallel with said web edge, which can result in the tapes being positioned wrongly on the finished package blanks to an extent which cannot be accpeted. It is not possible in practice to move the tape applicators along the stationary beam in response to this lateral wandering of the web. When switching from package blanks of one configuration to another or from one size to another, it is necessary normally to change the number of tapes and their positions relative to the transverse direction of the web. This change should be made in the shortest time possible and with high precision, in order to minimize production losses and also the number of rejects obtained. Similarly, when the tape supply is exhausted, it must be possible to replace the empty tape supply means with a full tape supply rapidly while the machine is in operation, therewith to minimize the occurence of rejects. The aforedescribed also applies when applying tapes, strips, or strings to a moving web for strengthening or decorating purposes.

One object of the present invention is to provide a novel and useful arrangement which greatly facilitates the aforesaid positioning and repositioning of the tape applicators and also the replacement of tape stores, such that the aforesaid problems and needs associated with conventional tape applying arrangements can be more readily resolved or satisfied.

To this end it is proposed in accordance with the present invention that in a tape applying arrangement of the kind described in the introduction the tape applicators can be adjusted positionally in relation to an applicator-setting beam which extends transversely to the direction of web movement, and can be locked to said beam in selected positions therealong, said beam preferably being provided with graduations therealong, and wherein the applicator-setting beam is, in turn, carried for movement in the direction of its length by a stationary carrier beam which extends parallel therewith. This arrangement affords the advantage that the tape applicators can be moved in unison across the web, e.g. so as to be positioned in given relationship with one edge of the web, and that only small forces are needed for this movement, since the applicator-setting beam does not carry the tape applicators. Furthermore, when the tape applicators are not locked to the applicator-setting beam, the applicators can be moved freely along the carrier beam and the preferably graduated applicator-setting beam to a desired new position along the applicator-setting beam irrespectively of the position of said beam in relation to the carrier beam.

So that the invention will be more readily understood and other features thereof made apparent an exemplifying embodiment of a tape applying arrangement constructed in accordance with the invention will now be described with reference to the accompanying drawings.

Figure 1:
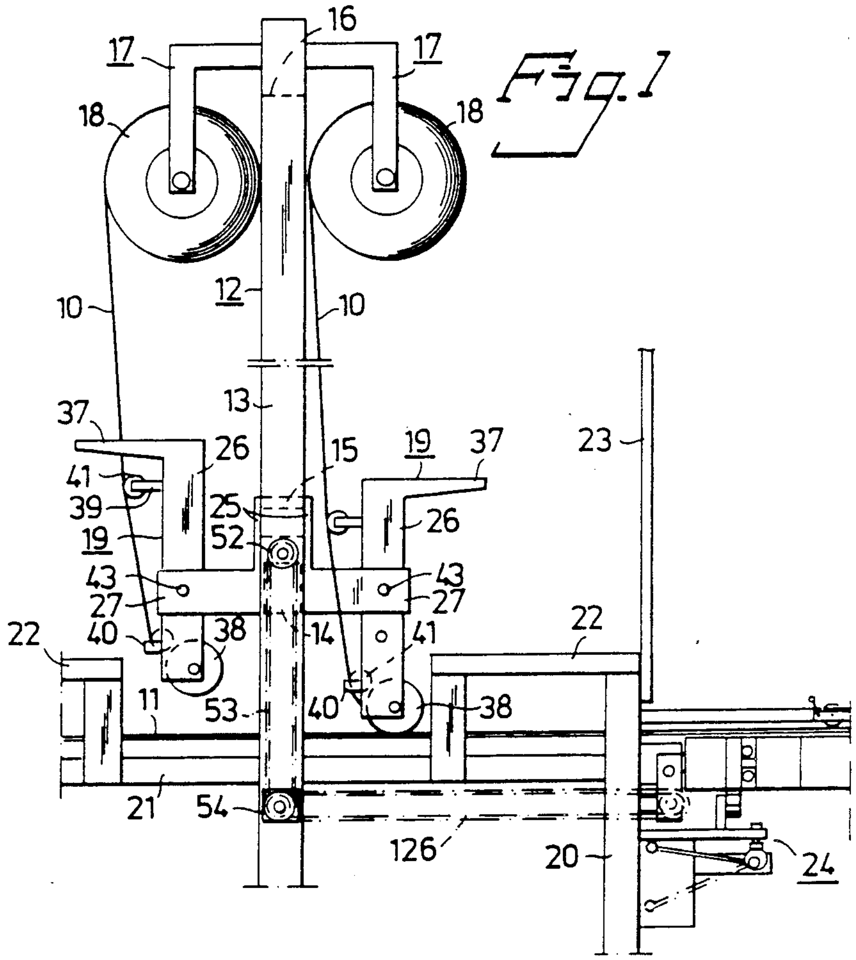
FIG. 1 is a schematic end view of a tape applying arrangement according to the invention provided with an arrangement for making longitudinal slits or for forming fractural impressions along the side of a material web opposite the tape.
Figure 2:
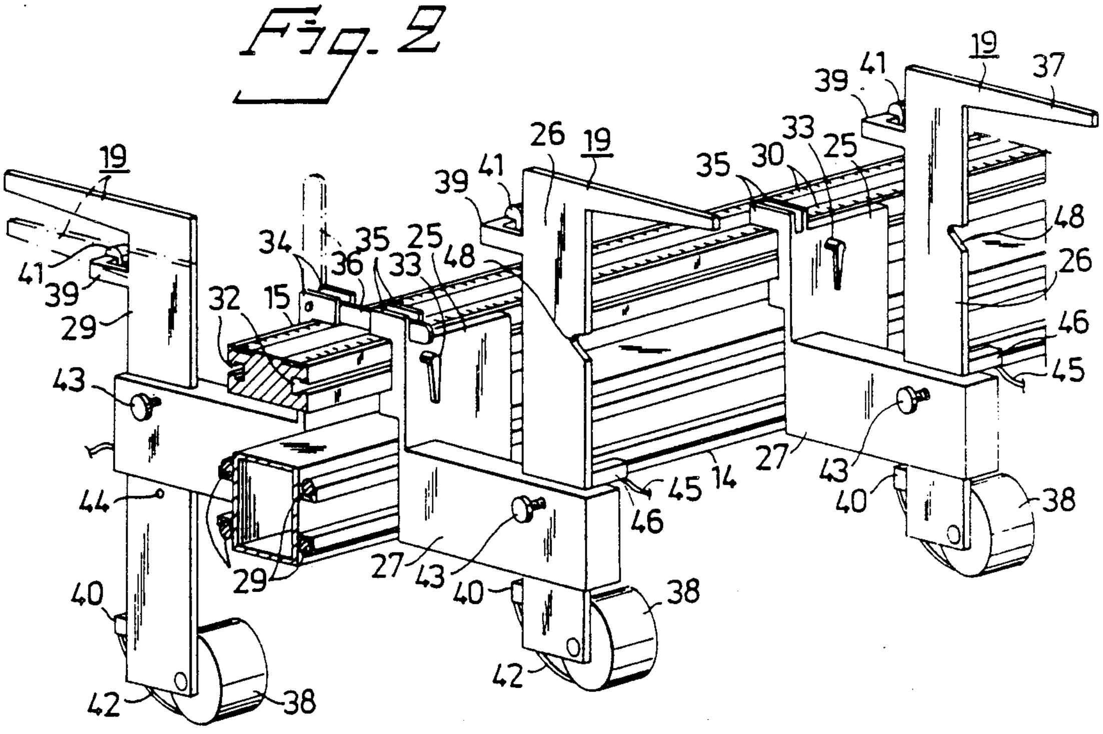
FIG. 2 illustrates in perspective a plurality of tape applicators with an associated applicator-setting beam and carrier beam forming part of the inventive arrangement illustrated in FIG. 1.
Figure 3:
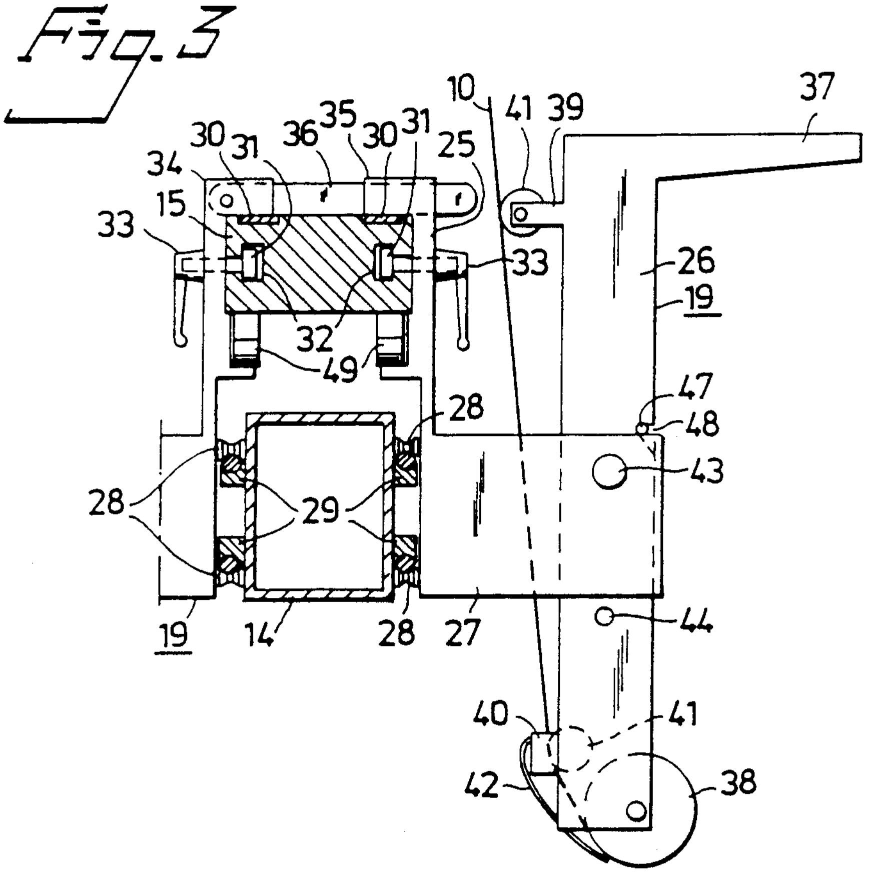
FIG. 3 is a partial sectional view through the arrangement illustrated in FIG. 2.

Figure illustrates schematically an inventive arrangement for applying tapes 10 onto a moving web 11 (moving from left to right in FIG. 1) and comprising a frame or stand structure generally referenced 12. The stand includes two posts or uprights 13 of which only one is shown in FIG. 1, each located on a respecitve side of the web, and a beam constructions comprised of beams 14, 15, 16 which extend horizontally above and across the web 11, and of which the beams 14 and 16 are rigidly connected to the uprights 13, whereas the beam 15 terminates at a distance therefrom. The beam constructions 14, 15, 16 supports a plurality of holders 17 each of which carries a respective tape store 18, and a plurality of tape applicators 19, each of which is intended to guide a respective tape 10 arriving from a tape store 18 to a location in which the tape is in contact with the web 11. The holders 17 and tape applicators 19, which are also described hereinafter with reference to FIGS. 2–6, can be adjusted positionally along the beam constructions 14, 15, 16. The frame stucture 12 also includes legs and longitudinally extending, horizontal beams 20, 21 which support walkways 22 and safety railing 23 which extend transversely across the web 11. The frame structure 12 also includes a facility, generally referenced 24, for creating weakening lines or the like along the side of the web 11 opposite the tape applicators 19, on each side of one or more tapes 10 applied to the web, as described hereinafter in more detail with reference to FIGS. 7–9. Each tape applicator 19 includes (FIGS. 1–3) a first part or carriage 25, which carries a second part or a leg 26 which is mounted for vertical movement in an outwardly projecting part 27 of the carriage 25. The carriages 25 are displaceably mounted on the beam 14 on one side or the other side of the beams 14, 15, with the aid of co-acting guide means 28, 29, which in the case of the illustrated embodiment comprise rollers 28 mounted on the carriages 25 co-acting with longitudinally extending rails 29 mounted on the opposite long sides of the beam 14. The beam 14 thus forms a stationary carrier beam which supports the tape applicators 19. The tape applicators 19 can be locked in selected positions of adjustment along the beam 15 located above the carrier beam 14. To facilitate positioning of the tape applicators 19 selectively along the applicator-setting beam 15, the latter beam is provided in the direction of its longitudinal axis with graduated bars or simply with graduations 30. The tape applicators 19 are secured in their respective set positions in relation to the beam 15 with the aid of screws 31 having heads which are received in and movable along T-grooves 32 in the mutually opposite long sides of the beam 15, but which are held against rotation in said grooves, the screw threaded parts of the screws 31 projecting from their assocaited T-groove 32 and passing through an opening in an assocaited carriage 25 and being in screw engagement with a nut means 33 located on the side of the carriage located opposite the T-groove 32, said nut means 33 being provided with a handle.

Each tape applicator 19 is moved to a selected position along its assocaited side of the applicator-setting beam 15, by slackening the locking device comprising a screw 31 and a nut means 33, and by displacing the tape applicator carried by the beam 14 axially therealong to a desired position in relation ot the applicator-setting beam 15, and by then tightening the locking device 31, 33, so as to lock the tape applicator in position. Each of the carriages 25 is provided with a pair of upstanding lugs 34, 35. Between the lugs 34 of each lug pair on the carriages 25 located on one side of the beams 14, 15 there is pivotally mounted a coupling arm 36 which can be swung down from an upstanding position, shown in chain lines, to a position between the lugs 35 of the lug pair of any selected carriage of the carriages 25 located on the other side of the beams 14, 15. The distance between the lugs 34 or 35 of each lug pair corresponds to the width of the coupling arm 36. The positioning of the lugs 34 or 35 on the carriages 25 located on opposite sides of the beams 14, 15 is such that a tape applicator 19 on one side of the beams 14, 15 can be connecetd by means of the associated coupling arm 36 with an oppositely located tape applicator on the other side of the beams 14, 15, as shown more clearly on the left of FIG. 2. Naturally the mutually connected tape applicators 19 can be displaced together relative to the beams 14, 15 subsequent to loosening their respective locking devices 31, 33, and can be fixed or locked in relation to the applicator-setting beam with the aid of solely one of said locking devices 31, 33.

Each leg 26 carries at its upper end a handle 37 and at its lower end a freely rotatable, journalled applicator roller 38. Furthermore, each leg 26 carries between the ends thereof upper and lower arms 39, 40, each of which has journalled thereon guide rollers 41 for guiding a tape 20 from a tape store 18 to the tape applicator roller 38. The reference 42 identified sprung guide fingers which are carried by the arms 40 and by means of which the leading end of a tape can be held loosely in the vicinity of an associated tape applying roller 38, in a manner such that the tape 18 to which said leading end belongs is entrained by the moving web 11 when the tape applying roller is brought into contact with the web and caused to roll in contact therewith. The reference 43 identifies sprung locking pins, each of which is carried by a respective part 27 of the carriages 25 and which can be inserted, preferably assisted by a spring, into an opening 44 in an associated leg 26, for locking the tape applicator 19 firmly in an upper, inoperative position shown to the left in FIG. 1 and to the right in FIG. 2. Subsequent to withdrawing the locking pin 43 from its associated opening 44, the leg 26 can be lowered to a lower position, shown to the right in FIG. 1 and to the left in FIG. 2, in which the tape applicator roller 38 abuts the web 11, having first passed a position of readiness located immediately above said lower position, in which readiness position a latching means 46 provided with a latching plunger 47 (FIG. 3) engages a recess 48 formed in the edge of the leg 26, the latching means 46 of the illustrated embodiment having the form of a solenoid and being remotely controlled through an electrical conductor 45.

The applicator-setting beam 15 together with the tape applicators 19 locked thereto can be displaced in the direction of the longitudinal beam axis in relation to the carrier beam 14, for example in correspondence to the position of the side edges of the web 11. The beam 15 is supported by the carrier beam 14. More specifically, the applicator-setting beam 15 of the illustrated embodiment is carried by the carrier beam 14 via the tape applicators 19 supported thereby, the carriages 25 of the tape applicators being provided to this end with rotatably journalled wheels 49 which support the applicator-setting beam 15. Longitudinal movement of the beam 15 is effected by means of a spindle 50 (FIG. 4) which engages in a screwthreaded bore in a part 51 rigidly connected to the beam 15, the spindle 50 also being journalled but locked against axial movement in a stationary frame part, which in the illustrated embodiment comprises one of the uprights 13. The spindle has fixed thereon a gear wheel 52 which is driven, via a chain indicated at 53, by a positioning motor 54 illustrated in FIG. 1. The positioning motor 54 is controlled by a conventional edge detector (not shown), such that when the web 11 wanders laterally off course, the motor 54 will be activated so as to rotate the spindle 50 in one direction or the other such as to maintain the applicator-setting beam 15, and therewith also the tape applicators 19 clamped thereto, in a pre-determined position relative to the web 11 irrespective of the lateral movement of the web.

Figure 6:
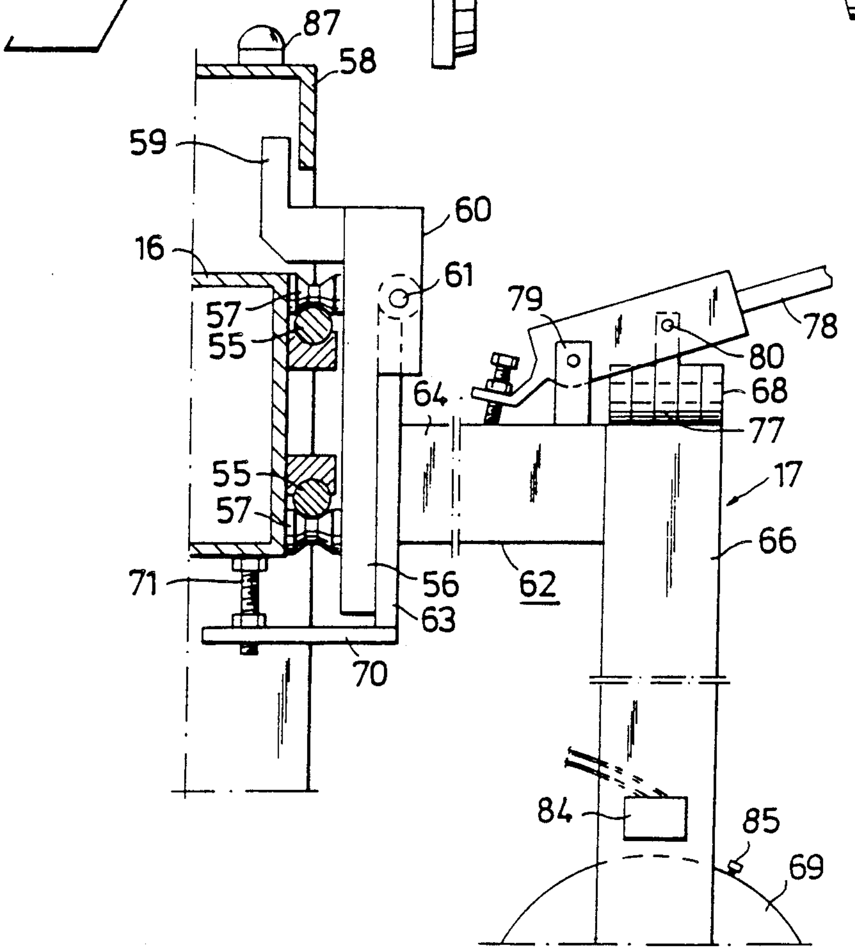
FIG. 6 is a partial end view of the holder illustrated in FIG. 5.

As clearly shown in FIG. 1, the tape store holders 17 are located at a considerable distance above the tape applicators 19, free therefrom. Holders 17 are arranged on both sides of the beam 16 and are carried by said beam. The preferred embodiment of the holders is seen best from FIGS. 5 and 6. The beam 16 has provided on both long sides thereof longitudinally extending guides 55 similar to the guides 29 on the carrier beam 14. Each holder 17 includes a part or carriage 56 which is guided for movement along the beam 16 and which is provided with rollers 57 for rolling action on guides 55. Extending above the beam 16 is a U-beam 58 having downwardly extending limbs which terminate short of the upper surface of the beam 16. The carriage 56 has mounted thereon angled arms 59 which extend through the gap between the beam 16 and the limbs of the U-beam 58, into the interior of the U-beam and therewith prevent the holder 17 from swinging unintentionally from the beam 16, in a clockwise direction as seen in FIG. 6. Extending between outwardly projecting parts 60 of the carriage 56 is a horizontal shaft 61 on which there is pivotally mounted an outwardly projecting support structure generally referenced 62. The support structure 62 incorporates a plate 63 which is jouranlled at its upper edge on the shaft 61 and from which there extends a support arm 64. The support arm 64 carries at its outer end a crosspiece 65. Depending from the mutually opposite ends of the crosspiece 65 are two arms 66, 67, of which the one arm 66 is fixed while the other arm 67 is pivotally mounted on the crosspiece 65 by hinge means 68 for movement between a position in which the arms extend vertically downwards, indicated in broken lines, and an outwardly swung position, shown in full lines. Each of the arms 66, 67 carries a rotatable bearing plate 69. The bearing plates 69 are intended to be pressed into a centre sleeve (not shown) on which tape is wound, to form a tape store 18 in roll form. An arm 70 extends from the bottom edge of the plate 63 and continues in under the beam 16, and carries an adjustable stop means in the form of a screw 71, which in the position of use of the holder 17 is urged against the under surface of the beam 16 by the torque exerted by the support structure 62, which is pivotable about said shaft 61, and also by the torque exerted by any tape store 18 present. Any tendency of the holders 17 to move along the beam 16 is counteracted by the friction acting between the stop means 71 and the beam 16. When the support means 62 is swung upwards about the shaft 61, the stop means 71 moves out of engagement with the beam 16, so that the associated holder 17 can be moved unimpeded relative to the beam 16, to a desired position above a tape applicator 19. Because the holders 17 are located at a relatively long vertical distance from the tape applicators 19, the positions of respective holders in relation to the tape applicators is not particularly critical, so that in the event of the web 11 wandering laterally off course it is not necessary for the holders 17 to take part in the web accompanying movement of the applicator-setting beam 15 and the tape applicators 19.

To facilitate pivoting of the arm 67 (see FIG. 5) there is journalled for movement in a groove or slot 72 in the crosspiece 65 a roller 73 which is biassed by a spring 74 in a direction towards the arm 67 and which is connected to the arm 67 via a linkage means 75. Located between the roller 73 and a stop member 76 is a wedge-shaped activating device 77, which is movable vertically between an upper position shown in FIG. 5 and a lower position in which the wedge device 77 has pressed or urged the roller 73 to the left in FIG. 5, against the action of the spring 74, while dogging the linkage arrangement 75 and the arm 67, such as to bring the arm 67 to a vertically depending position, indicated in chain lines, in which the arm 67 together with the arm 66 can support a tape store 18. The wedge device is operated by means of a lever 78 (see FIG. 6) which can be pivoted about a bearing 79 carried by the arm 64 and which is pivotally connected at 80 to the upper end of the wedge device 77.

The bearing plate 69 carried by the arm 67 is braked slightly by means of a brake 81 which comprises a brake show 83 which is pressed against the periphery of the bearing plate by means of a spring device 82. As a result of this arrangement the bearing plates 69 will cease to rotate immediately a tape store 18 carried thereby is emptied. Arranged on the arm 66 is a sensor 84 which is operative in detecting when a tape store is emptied, by sensing when the bearing plate 69 carried by the arm 66 ceases to rotate. Located on the periphery of the bearing plate 69 is a metallic promontory 85, the passage of which is sensed inductively by the sensor 84 during each revolution of the plate 69. When the sensor fails to register the passage of the plate 69 over a sufficiently long period of time, for example a time lapse in the order of 0.5–1 second, the sensor 84 sends a signal through conductors 45 and 86 to a visual alarm 87 (FIG. 5) and also to one of the latching arrangements 46, more specifically the latching arrangement 46 of a tape applicator 19 located opposite the tape applicator 19 supplied from the empty tape store 18.

Figure 7:
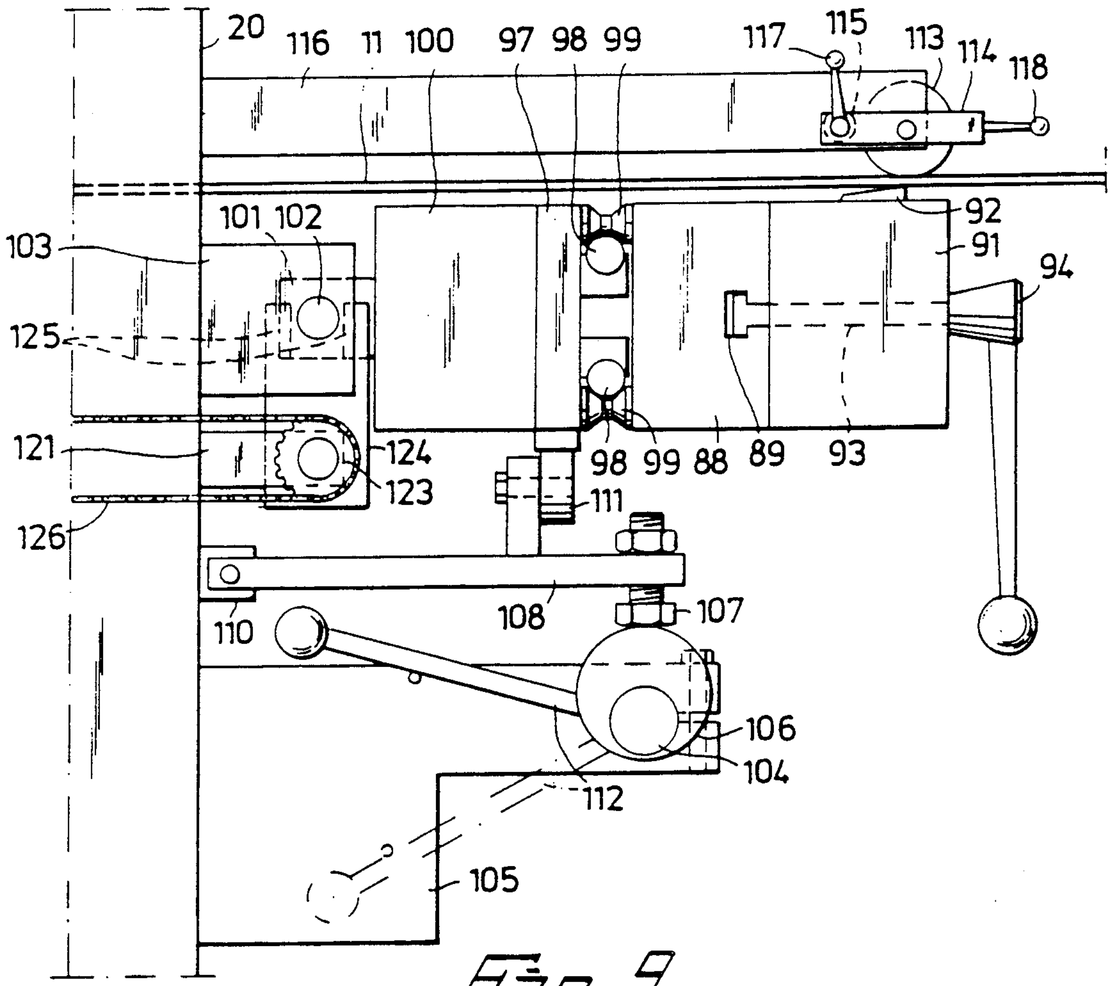
FIG. 7 is an end view, in larger scale, of the arrangement illustrated in FIG. 1 for making longitudinal slits or forming longitudinal fractural impressions in the material web.
Figure 9:
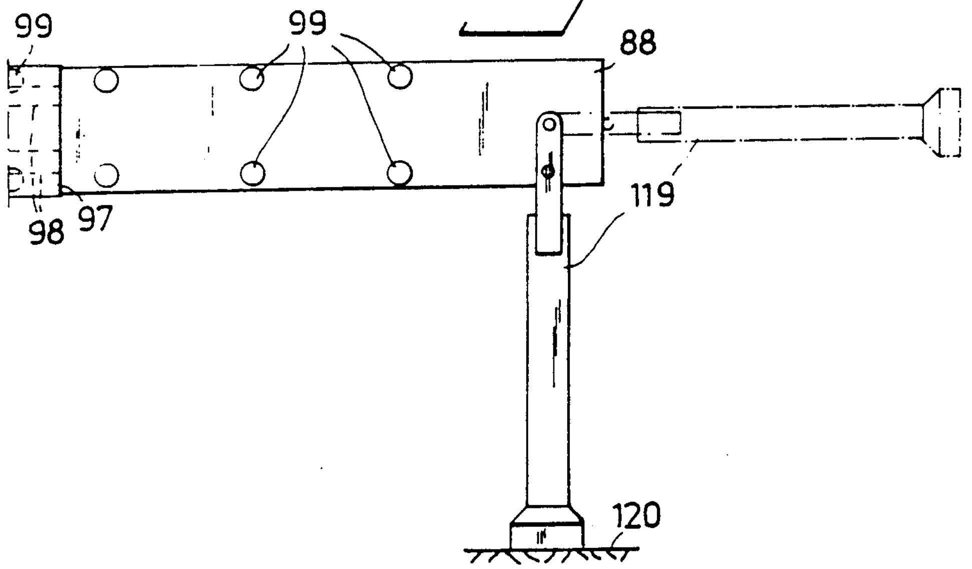
FIG. 9 is a side view of part of the arrangement illustrated in FIGS. 7 and 8 and illustrates the withdrawability of a tool holding beam.
Figure 8:
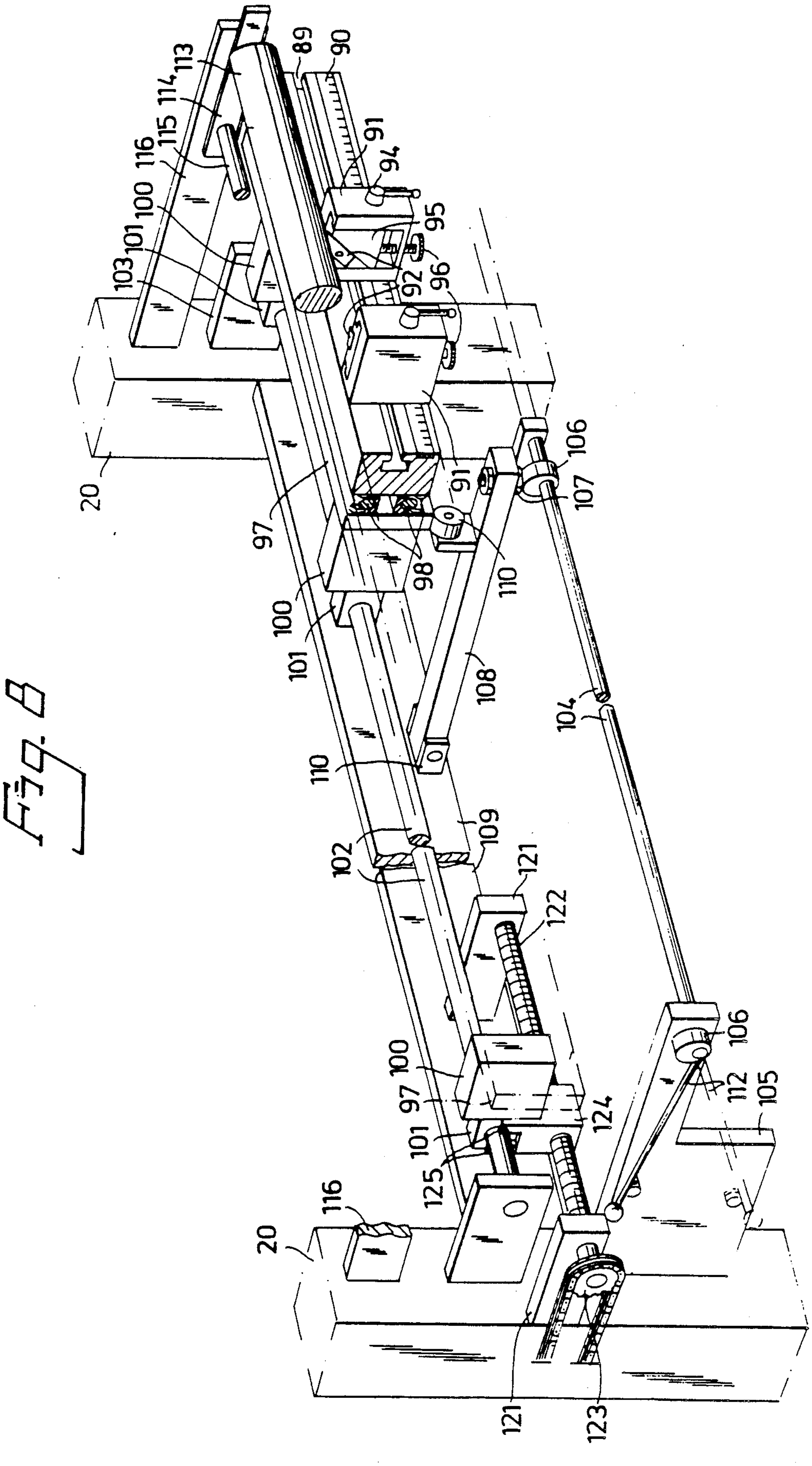
FIG. 8 is a perspective view of the arrangement illustrated in FIG. 7, certain parts being broken off for the sake of clarity.

Reference is now made to FIG. 7–9, which illustrate in more detail and in larger scale the facility generally referenced 24 in FIG. 1 for forming in the longitudinal direction of the web 11 weakening lines or the like in the form of shallow slits or grooves. The facility 24 includes an attachment beam 88 having provided along one side thereof a T-groove 89 and a graduated scale 90. Tool holders 91 for carrying slitting or grooving tools 92 mounted on the attachment beam can be adjusted to desired positions along the beam 88 with the aid of the graduated scale 90, the tool holders 91 being held securely in their selected positions by means of screws 93 provided with heads which can slide along the T-groove but which are held against rotation therein, the threaded parts of the screws 93 extending from the T-groove and passing through a hole or bore extending through an associated tool holder 91 and engaging a screwthreaded nut means 94 on the side of the holder 91 opposite the T-groove 89, said nut means 94 being provided with a handle. As will best be seen from FIG. 8, the tools 92 are to advantage capable of being held in oblique channels in a holder body 95 which can be adjusted to desired vertical positions relative to the holder 91, by means of a setting screw 96. The attachment beam 88 is carried by a support means which includes a carrier beam 97 which extends parallel with the attachment beam 88 and which is provided with guides 98 which extend along the side thereof facing the beam 88, wherewith a plurality of rollers 99 journalled on the attachment beam co-act with the guides 98 in a manner such as to enable the attachment beam to be moved in the direction of its longitudinal axis along the carrier beam 97. Arranged in spaced relationship along the opposite side of the carrier beam are a plurality of attachment devices 100 which carry bearings 101 which can be displaced and rotated relative to a shaft 102 which extends parallel with the beams 88, 97 and which is carried by arms 103 which extend outwardly from two legs 20, each of which is located on a respective side of the frame structure 12. Thus, the attachment means 100, the means 88, 97 and the tool holders 91 are also movable in unison along the shaft 102 and can be pivoted about the shaft, thereby enabling the tools 92 to be moved into and out of engagement with the undersurface of the web 11.

The tools 92 are raised and lowered with the aid of a shaft 104, at least the ends of which are journalled for rotation in arms which are carried by the frame structure 12 and of which one is shown at 105 in FIG. 8. The shaft 104 is provided with eccentric cam plates 106 which abut adjustable abutments 107 at the outer ends of arms 108, the opposite ends of which arms are carried by a beam 109 which extends horizontally between the frame legs 20. The arms 108 are provided with bearings 110 which permit the arms 108 to pivot about a pivot axis extending parallel with the shaft 102. The arms 108 carry support rollers 111 against which the carrier beam 97 rests. The axes of the rollers 111 extend substantially parallel with the direction of web movement and substantially perpendicularly to the longitudinal extension of the carrier beam 97. The tools 92 are lowered from the raised position illustrated in FIGS. 7 and 8, by rotating the shaft 104 with the aid of a lever 112 rigidly connected thereto, for example to the position in chain lines, the lever 112 being locked in desired position of adjustment by means of locking means not shown.

The web 11 is held against the tool 92 be means of a roller 113 which is intended to roll against the upper surface of the web and which is journalled for rotation in side members 114, these side members being rigidly connected to a shaft 115 which extends parallel with the shaft 102. The opposite ends of the shaft 115 are journalled in arms 116 which extend from the frame legs 20 in the direction of travel of the web 11. The shaft 115 can be locked in a desired position of rotation relative to the arms 116 with the aid of a locking device indicated at 117 in FIG. 7. Subsequent to releasing the locking action between the shaft 115 and the arms 116, the assembly 113–115 can be swung with the aid of a lever 118 illustrated in FIG. 7. Thus, this arrangement enables the roller 113 to be readily moved to a desired position either in contact or out of contact with the web 11.

In order to facilitate adjustment of the tool holders 91 carrying tools 92, along the attachment beam 88, the beam 88, with the holders 91 and tools 92 carried thereby, can be withdrawn axially from the carrier arrangement 97, 98, 100, 101, subsequent to lowering the tools 92 out of engagement with the web 11, to positions in which the beam is located completely or partially on one side of the web 11. This facilitates adjustment to the settings of respective tools holders 19 in relation to the attachment beam 88 provided with the graduations 90. The attachment beam 88 can then be re-inserted into the carrier arrangement 97, 98, 100, 101 and connected thereto in a pre-determined position with the aid of devices not shown. As illustrated in FIG. 9, the attachment beam 88 is preferably provided with a leg 119 for supporting the distal end of the attachment beam against a support surface 120 when the attachment beam is withdrawn from the carrier arrangement. As indicated in chain lines, the leg 119 can be hinged so that it can be rasied, e.g. to a position in which it extends substantially parallel with the beam 88 when it is not needed to support the attachment beam in its withdrawn position.

Figure 4:
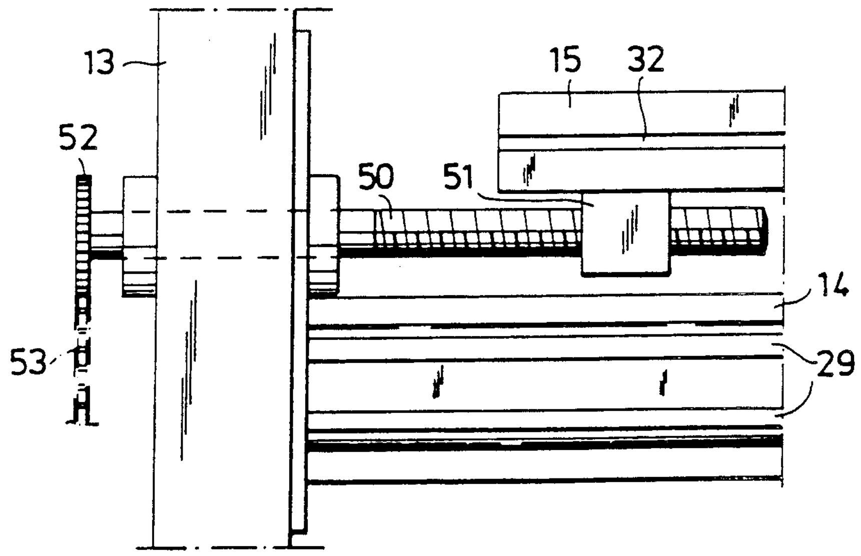
FIG. 4 is a side view of that part of the tape applying arrangement in FIG. 1 nearest the viewer.
Figure 5:
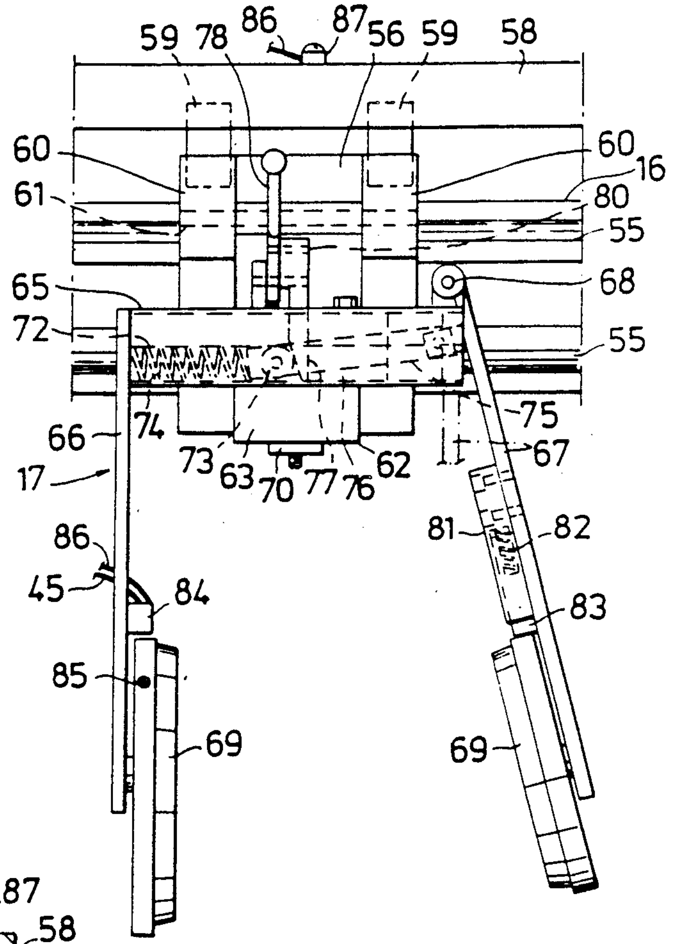
FIG. 5 is a side view of a tape-store holder used in the tape applying arrangement.

A screw spindle 122 which extends parallel with the shaft 102 is journalled for rotation, but held against axial movement, in two arms 121 which project out in the longitudinal direction of the web 11 from a frame leg 20 and from the horizontal beam 109 respectively. One end of the spindle 122 has fixedly mounted thereon a sprocket wheel 123. The spindle 122 extends through and is in screw engagement with a screwthreaded bore provided in a block 124 which has four upwardly extending prongs 125, which form two forks each located adjacent a respective side of one and the same bearing 101, the prongs of each fork being located adjacent opposite sides of the shaft 102. As a result of this arrangement, when the spindle 122 rotates and the block 124 consequently moves along the spindle, the fingers 125 dog the carrier arrangement 97, 98, 100, 101, the attachment beam 88 and the holders 91 with tools 92 for movement in a horizontal plane transversely to the direction of travel of the web 11. The spindle 122 is preferably driven by a setting motor, via a chain 126 extending around the sprocket wheel 123. The setting motor is controlled by a known web-edge detector (not shown) such that when the web 11 wanders laterally off course the motor is caused to rotate the spindle 122 in either one direction or the other, so as to hold the carrier arrangement 97, 98, 100, 101, the attachment beam 88 and the tool holders 91 with tools 92 in a pre-determined position relative to the edges of the web, irrespective of the lateral movement of the web 11. A particular advantage is afforded when the spindle 122 and the spindle 50, described in the aforegoing mainly with reference to FIG. 4, are driven in unison in response the position of the side edges of the web 11. This unison drive of the two spindles can be achieved in the manner illustrated in FIG. 1, by providing the motor 54 with drive gears for driving both the chain 53 and the chain 126.

Significant advantages are afforded by the inventive arrangement. For example, the tape applicators 19 can be readily adjusted to different positional settings, even when the machine is working, and the exchange of one tape store 18 for another can be effected in the minimum of time and can also be automated with essentially negligible losses in production and with the minimum of rejects in conjunction with a tape store change. The tape applicators 19 and grooving or slitting tools 92 associated therewith can be readily caused to accompany lateral movement of the web 11, either each per se or in unison, so that a high degree of precision in manufacture can be achieved when trimming off extremely narrow strips along the edges of the web 11, so as to provide sharply defined edges. The position of the cleanly cut web edges can be advantageously sensed with the aid of a conventional angle indicator, operative in producing control signals in a known manner, for driving the motor 54 in response to lateral movement of the web 11.

It will be understood that the invention is not restricted to the aforedescribed and illustrated exemplifying embodiments thereof, and that modifications can be made within the scope of the inventive concept defined in the following claims.

I claim:

1. An arrangement for applying relatively narrow tapes onto a moving web, in the direction if its length, comprising a plurality of holders for supporting a respective tape store, and further comprising a plurality of tape applicators for guiding a respective tape arriving from a tape store to a location at which the tape is in contact with the web, wherein said holders and tape applicators are carried by and capable of being adjusted positionally along a beam structure which extends transversely to the direction of web movement, and wherein the tape applicators can be adjusted positionally in relation to an applicator-setting beam, which extends transversely to the direction web movement, and can be locked to said beam in selected positions therealong, and wherein the applicator-setting beam is, in turn, carried for movement in its longitudinal direction by a stationary carrier beam which extends parallel therewith.

2. An arrangement according to claim 1, wherein the applicator-setting beam and tape applicators locked in relation thereto are automatically displaceable in correspondence to the momentary position of the side edges of the web.

3. An arrangement according to claim 1, wherein the applicator-setting beam has formed in a part thereof which is non-displaceable along said beam, a screwthreaded bore which receives a screw threaded spindle which is journalled for rotation, but held against axial movement, in a stationary frame part, such that rotation of the spindle results in axial movement of the applicator-setting beam and the applicators locked thereto.

4. An arrangement according to claim 1, wherein tape applicators are arranged on mutually opposite long sides of said beams.

5. An arrangement according to claim 4, wherein tape applicators located at mutually opposite long sides of said beams are pair-wise adjustable to positions opposite one another.

6. An arrangement according to claim 1, wherein the tape applicators are carried by and displaceable along the stationary carrier beam.

7. An arrangement according to claim 1, wherein the applicator-setting beam is carried by the stationary carrier beam via the tape applicators.

8. An arrangement according to claim 1, wherein each tape applicator includes an applicator roller which is intended to roll against the web, and means for detachably holding a leading tape end in the vicinity of the underside of the applicator roller.

9. An arrangement according to claim 1, wherein each tape applicator includes a first part which is supported by the carrier beam and which can be locked relative to the applicator-setting beam, and a second part which is mounted for substantially vertical movement in the first part and which is moveable between a lower operative position, in which it is adapted to be contact with the moving web, and an upper inoperative position.

10. An arrangement according to claim 9, wherein said second part is adapted to be detachably held in a position of readiness at a small distance above said working position.

11. An arrangement according to claim 1, wherein the tape-store holders are supported in spaced relationship with the tape applicators by and are adapted to be positionally adjusted transversely of the direction of web movement along a separate further beam which extends parallel with the applicator-setting beam and the carrier beam.

12. An arrangement according to claim 11, wherein tape-store holders are arranged along opposite sides of the further beam.

13. An arrangement according to claim 11, wherein each tape-store holder includes a part which is guided for axial movement along the further beam by guides, and a support means which projects out from said part and which is provided with two bearing plates each of which is intended to co-act with a respective end of a sleeve having an axis which extends parallel with the further beam and which has a tape store wound thereupon.

14. An arrangement according to claim 13, wherein the support means is journalled for pivotal movement about a horizontal shaft which is carried by said tape-store holder part and which extends parallel with the further beam, and wherein the support means is provided with an abutment which in the position of use of the holder abuts the further beam and counteracts, by friction, displacement of the holder along said beam, but which is brought out of engagement with the further beam when the support means is swung upwardly, thereby enabling the holder to be freely moved along said beam.

15. An arrangement according to claim 1, wherein each tape-store holder is provided with a sensor for detecting when the tape store carried by the holder is empty.

16. An arrangement according to claim 15, wherein said sensor is constructed to detect an empty tape store, by detecting a stationary state of said bearing plates and, when establishing that a stationary state prevails, to release the latching means of a tape applicator located opposite the tape applicator which has been supplied with tape by the empty tape store.

17. An arrangement according to claim 16, characterized in that at least one of the bearing plates co-acts with braking means.

18. An arrangement according to claim 13, wherein the bearing plates are carried for rotation at the outer ends of two arms incorporated in the support means, of which arms one is pivotally mounted so as to enable one of the bearing plates to be moved away from the other, in order to enable a new tape supply to be inserted.

19. An arrangement according to claim 1, having means for making longitudinal indents in the form of slits or grooves in the side of the web remote from the tape applicators, said means comprising an attachment beam which extends parallel with the plane of the web transversely of the direction of web movement, and a plurality of tool holders which are intended to carry indenting tools and which can be adjusted to selected positions on the attachment beam and firmly locked in said positions, the attachment beam being raisable and lowerable in order to bring said tools into and out of engagement with the web, wherein the attachment beam with the tool holders mounted thereon are detachably carried by a carrier arrangement and, subsequent to being released, can be withdrawn from the carrier arrangement in its axial direction to positions in which it is located at least partially on one side of the web.

20. An arrangement according to claim 19, wherein the attachment beam is provided on at leas one end thereof with a leg for supporting the distal end of the withdrawn attachment beam against a support surface.

21. An arrangement according to claim 19, wherein the carrier arrangement can be automatically displaced together with the attachment beam carried thereby in the direction of the longitudinal axis of said attachment beam in correspondence with the position of the side edges of the web.

22. An arrangement according to claim 21, wherein the carrier arrangement is provided, in a part which is non-displaceable relative to said carrier arrangement with a screwthreaded bore which receives a screwthreaded spindle which is non-displaceably journalled in a stationary frame part and which extends parallel with the plane of the web and transversely to the longitudinal axis of the web, and which can be rotated so as to displace the carrier arrangement and the attachment beam carried thereby in the axial direction of said beam.

23. An arrangement according to claim 22, wherein the applicator-setting beam has formed in a part thereof which is non-displaceable along said beam, a screwthreaded bore which receives a screwthreaded spindle which is journalled for rotation, but held against axial movement, in a stationary frame part, such that rotation of the spindle results in axial movement of the applicator-setting beam and the applicators locked thereto, and wherein said spindle and the screwthreaded spindle for displacing the carrier arrangement and the attachment beam carried thereby are driven in unison in response to changes in the position of the side edges of the web.

24. An arrangement according to claim 1, wherein the applicator-setting beam is provided with graduations therealong.

25. An arrangement according to claim 5, wherein the tape applicators positioned opposite one another are mutually connectable in pairs in their mutual positions of adjustment.

26. An arrangement according to claim 7, wherein the applicator-setting beam is carried by the stationary carrier beam via support rollers which are jouranlled on the tape applicators and which support the applicator-setting beam.

27. An arrangement according to claim 10, wherein said second part is adapted to be held in said position of readiness with the aid of a latching means which can be released by remote control.

28. An arrangement according to claim 11, wherein said further beam is located at a considerable distance from the tape applicators.

29. An arrangement according to claim 15, wherein said sensor is constructed to detect an empty tape store, by detecting a stationary state of said bearing plates and, when establishing that a stationary state prevails, to activate an alarm.

30. An arrangement according to claim 29, wherein at least one of the bearing plates co-acts with braking means.

31. An arrangement according to claim 20, wherein said leg is collapsable.

* * * * *